(12) United States Patent
Jeong et al.

(10) Patent No.: US 10,620,030 B2
(45) Date of Patent: Apr. 14, 2020

(54) MEASURING VESSEL AND LAUNDRY TREATMENT APPARATUS

(71) Applicant: LG Electronics Inc., Seoul (KR)

(72) Inventors: Kwanwoong Jeong, Seoul (KR); Yanghwan No, Seoul (KR)

(73) Assignee: LG Electronics Inc., Seoul (KR)

( * ) Notice: Subject to any disclaimer, the term of this patent is extended or adjusted under 35 U.S.C. 154(b) by 501 days.

(21) Appl. No.: 15/058,234

(22) Filed: Mar. 2, 2016

(65) Prior Publication Data

US 2016/0258802 A1 Sep. 8, 2016

(30) Foreign Application Priority Data

Mar. 2, 2015 (KR) .................. 10-2015-0028985

(51) Int. Cl.
*G01F 19/00* (2006.01)
*D06F 39/02* (2006.01)

(52) U.S. Cl.
CPC ............ *G01F 19/00* (2013.01); *D06F 39/024* (2013.01); *D06F 39/02* (2013.01)

(58) Field of Classification Search
USPC ......................................... D9/436; D10/46.3
See application file for complete search history.

(56) References Cited

U.S. PATENT DOCUMENTS

| | | | | |
|---|---|---|---|---|
| 1,718,897 A * | 6/1929 | Dunbar | ................... | G01F 19/00 222/158 |
| 3,231,909 A * | 2/1966 | Candor | ................... | D06F 25/00 34/596 |
| 3,526,138 A * | 9/1970 | Swett | ................... | G01F 19/002 206/514 |
| 3,888,391 A | 6/1975 | Merz | | |
| 4,014,105 A * | 3/1977 | Furgal | ................... | C11D 3/0015 118/76 |
| 6,095,380 A | 8/2000 | Fagg et al. | | |
| 9,354,098 B2 * | 5/2016 | Breit | ................... | G01F 19/00 |

(Continued)

FOREIGN PATENT DOCUMENTS

| | | |
|---|---|---|
| CN | 2182986 | 11/1994 |
| CN | 1600971 | 3/2005 |
| EP | 1813708 | 8/2007 |

(Continued)

OTHER PUBLICATIONS

International Search Report and Written Opinion in International Application No. PCT/KR2016/001996, dated May 10, 2016, 9 pages.

(Continued)

*Primary Examiner* — Rita P Adhlakha
(74) *Attorney, Agent, or Firm* — Fish & Richardson P.C.

(57) ABSTRACT

A measuring vessel includes a first body that defines a first through hole. The measuring vessel further includes a second body that is located in the first through hole and that defines a second through hole. The measuring vessel further includes a first connection unit that connects the first body and the second body and that defines a first storage space between the first through hole and an outer circumferential surface of the second body. The measuring vessel further includes a second connection unit that is configured to close a surface of the second through hole to define a second storage space.

14 Claims, 3 Drawing Sheets

(56) References Cited

U.S. PATENT DOCUMENTS

2003/0004082 A1   1/2003   Masschelein et al.

FOREIGN PATENT DOCUMENTS

| EP | 2014817 | 1/2009 |
|----|---------|--------|
| JP | 2005-112370 | 4/2005 |
| JP | 3132806 | 5/2007 |
| KR | 10-1474500 | 12/2014 |
| WO | 1996/000178 | 1/1996 |
| WO | 2001/032973 | 5/2001 |

OTHER PUBLICATIONS

Extended European Search Report issued in European Application No. 16158081.6 dated Jun. 17, 2016, 9 pages.
Chinese Office Action in Chinese Application No. 201610115145.5, dated Jun. 5, 2018, 13 pages.
Chinese Office Action in Chinese Application No. 201610115145.5, dated Sep. 4, 2019, 16 pages (with English translation).

* cited by examiner

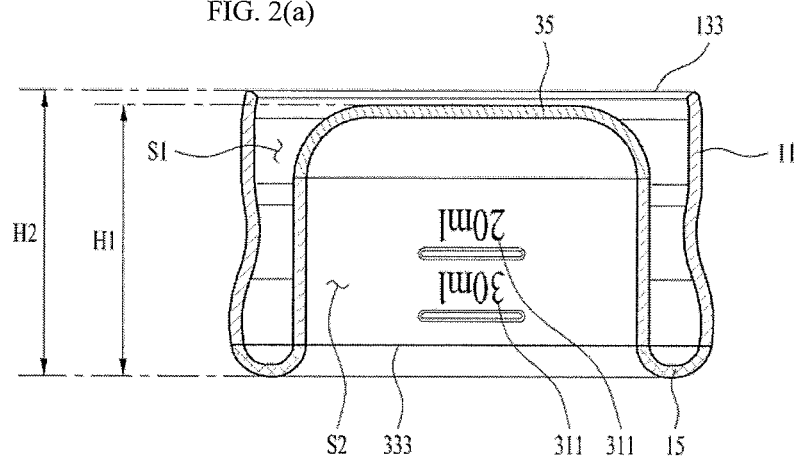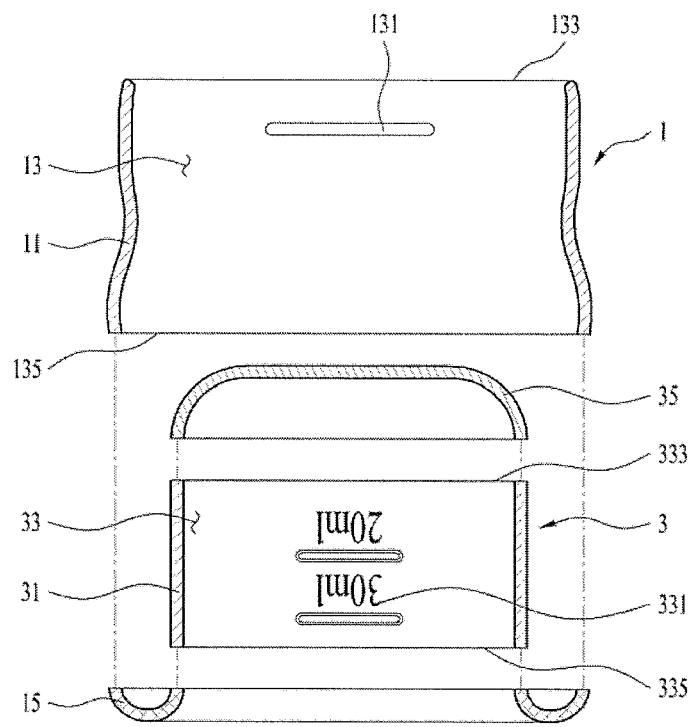

[FIG. 3]
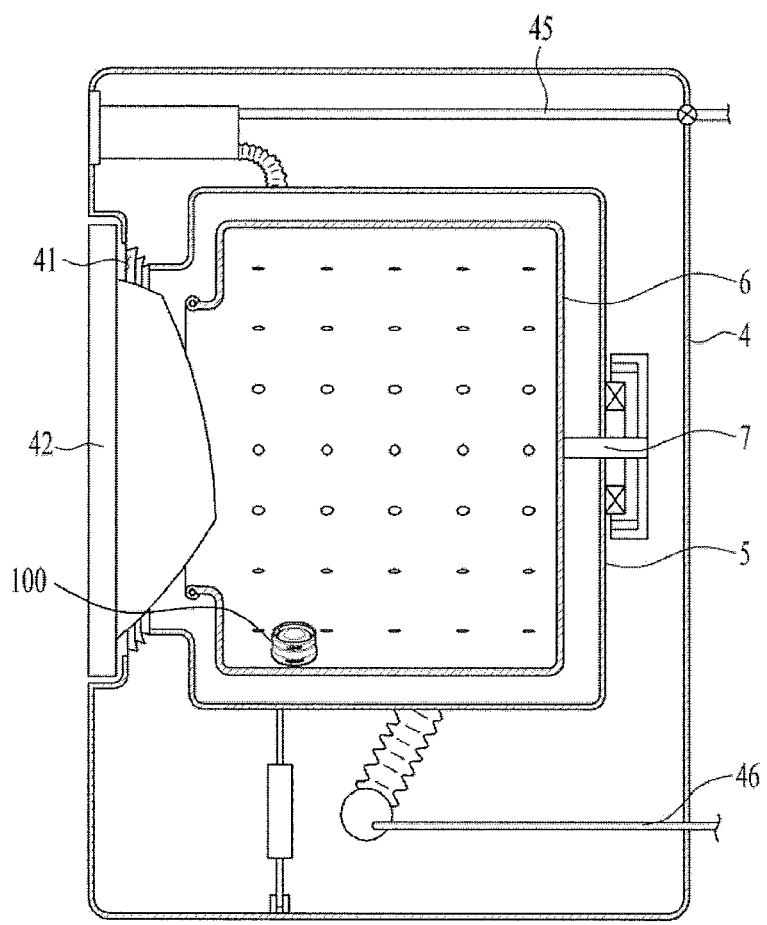

MEASURING VESSEL AND LAUNDRY TREATMENT APPARATUS

CROSS REFERENCE TO RELATED APPLICATION

This application claims the benefit of Korean Patent Application No. 10-2015-0028985, filed on Mar. 2, 2015, which is incorporated by reference.

FIELD

The present disclosure relates to a laundry treatment apparatus with a measuring vessel.

BACKGROUND

Various types of measuring vessels capable of measuring liquid or powder detergents have been used. Conventional measuring vessels are configured to have a structure in which a measuring scale is formed on the surface of a measuring vessel for storing detergent and a user determines a necessary amount of detergent using the scale after the user supplies a predetermined amount of detergent into the measuring vessel irrespective of the kind of the detergent.

SUMMARY

According to an innovative aspect of the subject matter described in this application, a measuring vessel includes: a first body that defines a first through hole; a second body that is located in the first through hole and that defines a second through hole; a first connection unit that connects the first body and the second body and that defines a first storage space between the first through hole and an outer circumferential surface of the second body; and a second connection unit that is configured to close a surface of the second through hole to define a second storage space.

The measuring vessel may include more or more of the following optional features. The first storage space and the second storage space have different volumes. The first storage space is configured to measure an amount of a powder detergent. The second storage space is configured to measure an amount of a liquid detergent. The first storage space is configured to measure an amount of a liquid detergent. The second storage space is configured to measure an amount of a powder detergent. The first connection unit is configured to connect a lower end of the first body with a lower end of the second body. The second connection unit is connected to an upper end of the second body. A distance between the first connection unit and the second connection unit is less than a distance between the first connection unit and an upper end of the first body. The first storage space is configured to store a liquid detergent. The second storage space is configured to store a powder detergent. A single radius of curvature defines a cross-sectional shape of the second connection unit.

The measuring vessel further includes: a first indication unit that is located at an upper part of an outer circumferential surface of the first body and that is configured to indicate an amount of detergent in the first storage space; and a second indication unit that is located at a lower part of the outer circumferential surface of the first body and that is configured to indicate an amount of detergent in the second storage space. The second indication unit is a letter or a symbol that is legible based on the second connection unit facing ground. The measuring vessel further includes: a first indication unit that is located at a lower part of an outer circumferential surface of the first body and that is configured to indicate an amount of detergent in the first storage space; and a second indication unit that is located at an upper part of the outer circumferential surface of the first body and that is configured to indicate an amount of detergent in the second storage space. The first indication unit is a letter or a symbol that is based on the second connection unit facing ground. The measuring vessel further includes: a first measuring unit that is configured to indicate an amount of detergent that is stored in the first storage space. The measuring vessel further includes: a second measuring unit that is configured to indicate an amount of detergent that is stored in the second storage space. The second measuring unit is configured as a letter or a symbol that is legible based on the second connection unit facing ground.

According to another innovative aspect of the subject matter described in this application, a laundry treatment apparatus includes: a cabinet; a tub that is located in the cabinet and that is configured to receive wash water; and a drum that is located in the tub, that is configured to receive laundry, and that is configured to receive a measuring vessel. The measuring vessel includes: a first body that defines a first through hole; a second body that is located in the first through hole and that defines a second through hole; a first connection unit that connects the first body and the second body and that defines a first storage space between the first through hole and an outer circumferential surface of the second body; and a second connection unit that is configured to close a surface of the second through hole to define a second storage space.

The laundry treatment apparatus may include more or more of the following optional features The first storage space and the second storage space have different volumes. The first storage space is configured to measure an amount of a powder detergent. The second storage space is configured to measure an amount of a liquid detergent. The first storage space is configured to measure an amount of a liquid detergent. The second storage space is configured to measure an amount of a powder detergent. The first connection unit is configured to connect a lower end of the first body with a lower end of the second body. The second connection unit is connected to an upper end of the second body.

An object of the subject matter described in this application lies in a measuring vessel that is capable of measuring the maximum amount of two or more different kinds of detergent at the time of treating a predetermined reference amount of laundry and a laundry treatment apparatus having the same.

Another object of the subject matter described in this application lies in a measuring vessel that is capable of preventing a user from using an excessive amount of detergent at the time of treating a reference amount of laundry and a laundry treatment apparatus having the same.

BRIEF DESCRIPTION OF THE DRAWINGS

FIGS. 2(a) and 2(b) are sectional views of example measuring vessels.

FIG. 3 is a view of an example laundry treatment apparatus.

DETAILED DESCRIPTION

A measuring vessel is characterized in that the measuring vessel includes at least two storage spaces for storing detergents (for example, a liquid detergent and a powder detergent to be measured) and in that introduction ports of the respective storage spaces, through which detergents are discharged or supplied, are not located on the same plane.

Figure 1A:
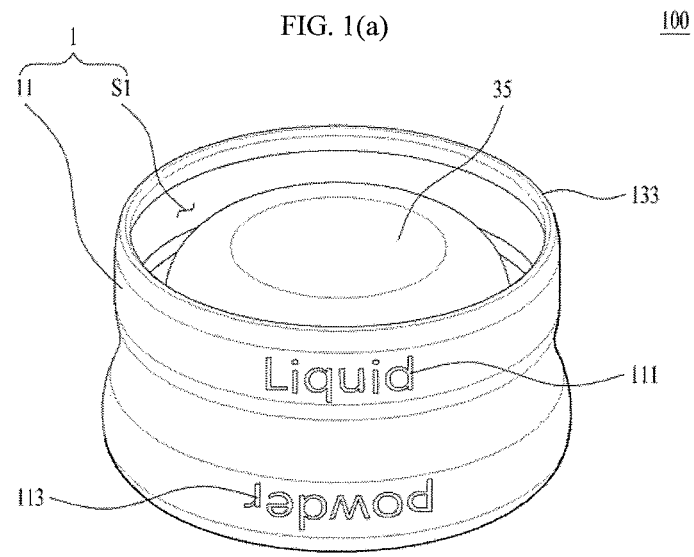
FIGS. 1(a) and 1(b) are views of example measuring vessels.
Figure 1B:
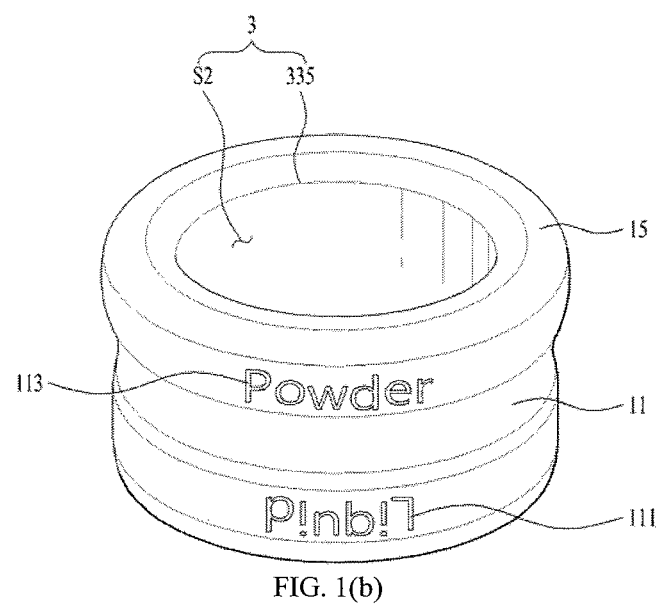

FIG. 1 illustrates an example measuring vessel 100. The measuring vessel 100 may include two separate storage spaces S1 and S2, and the measuring vessel 100 may be configured to have a W shape when viewed in section.

In some implementations, the measuring vessel 100 may include a first storage unit 1 having a first storage space S1 for storing a detergent and a second storage unit 3 having a second storage space S2 for storing a detergent, the second storage space S2 being separated from the first storage space S1.

One selected from between the first storage space S1 and the second storage space S2 may be configured to measure the amount of a powder detergent, and the other selected from between the first storage space S1 and the second storage space S2 may be configured to measure the amount of a liquid detergent. FIG. 1 shows an example in which the first storage space S1 is configured to measure the amount of a liquid detergent, and the second storage space S2 is configured to measure the amount of a powder detergent.

As shown in FIG. 2, the first storage unit 1 includes a first body 11 forming the external appearance of the measuring vessel and a first through hole 13 formed through the first body 11, and the second storage unit 3 includes a second body 31 located in the first through hole 13 and a second through hole 33 formed through the second body 31.

An upper open surface 133 and a lower open surface 135 are formed at the upper surface and the lower surface of the first body 11, respectively, by the first through hole 13, and a second upper open surface 333 and a second lower open surface 335 are formed at the upper surface and the lower surface of the second body 31, respectively, by the second through hole 33.

Since the second upper open surface 333, provided at the second body 31, is closed by a second connection unit 35, the second storage space S2 is defined by the second body 31 and the second connection unit 35. Consequently, a user may supply a detergent into the second storage space S2, or may discharge the detergent from the second storage space S2, through the second lower open surface 335.

The sectional shape of the second connection unit 35 may have a single radius of curvature. In some implementations, the sectional shape of the second connection unit 35 may have two radii of curvature.

The sectional shape of the second connection unit 35 having one radius of curvature means that the sectional shape of the second connection unit 35 may be a hemispherical.

The sectional shape of the second connection unit 35 having two radii of curvature means that at least two sections of the second connection unit 35 have different radii of curvature. In the example shown in FIG. 2, the second connection unit 35 includes a flat part having an infinite radius of curvature and a curved part, provided at the edge of the flat part, having a predetermined radius of curvature.

The lower end of the first body 11 and the lower end of the second body 31 are connected to each other via a first connection unit 15.

Since the lower open surface 135, formed at the lower surface of the first body 11 by the first through hole 13, is closed by the first connection unit 15 and the second storage unit 3, the first storage space S1, which stores a detergent, is defined between the first through hole 13 and the second body 31. Consequently, the user may supply a detergent into the first storage space S1, or may discharge the detergent from the first storage space S1, through the upper open surface 133.

In some implementations, the first storage space S1 is configured to store a liquid detergent and the second storage space S2 is configured to store a powder detergent, and the distance H1 from the lowest point of the first connection unit 15 to the highest point of the second connection unit 35 may be shorter than the distance H2 from the lowest point of the first connection unit 15 to the upper end of the first body 11.

In some implementations, the highest point of the second connection unit 35 is lower than the upper end of the first body 11 when the measuring vessel 100 is located such that the first connection unit 15 faces the ground, and it may be possible to minimize the detergent supplied into the first storage space S1 from being discharged from the first storage space S1 when measuring the amount of the liquid detergent.

The upper open surface 133 and the second lower open surface 335 may be provided on different planes. FIG. 2 shows an example in which the upper open surface 133 is provided at the upper surface of the measuring vessel 100, and the second lower open surface 335 is provided at the bottom surface of the measuring vessel 100.

The upper open surface 133 and the second lower open surface 335 are provided at opposite surfaces of the measuring vessel 100 in order to maximize the volume of the first storage space S1 and the volume of the second storage space S2 and, in addition, to minimize the size of the measuring vessel 100.

The first storage space S1 and the second storage space S2 may have the same volume. In some implementations, the first storage space S1 and the second storage space S2 may have different volumes.

In some implementations, the volume of the first storage space S1 is set to the maximum amount of a first detergent necessary to treat (for example, wash, rinse, or dry) a predetermined reference amount of laundry and the volume of the second storage space S2 is set to the maximum amount of a second detergent (e.g. a detergent different in kind from the first detergent) necessary to treat the reference amount of laundry, and it may not be necessary to provide an additional measuring unit (for example, a scale) for enabling the user to recognize the amount of the detergent at the respective storage spaces S1 and S2.

In some implementations, it is possible to provide a single measuring vessel that is capable of determining the maximum amount of two kinds of detergents necessary to treat a reference amount of laundry and, in addition, to minimize the volume of the measuring vessel.

Furthermore, in the measuring vessel 100, it is possible to prevent the user from excessively using the detergent at the time of treating the reference amount of laundry.

The user may use the measuring vessel 100 in order to treat less than the reference amount of laundry. In some implementations, the measuring vessel 100 may further include at least one selected from between a first measuring unit 131 for enabling the user to determine the amount of the detergent stored in the first storage space S1 and a second measuring unit 311 for enabling the user to determine the amount of the detergent stored in the second storage space S3.

The first measuring unit 131 may be configured as a letter or a symbol that is readable when the first body 1 is located such that the second lower open surface 335 faces the ground, and the second measuring unit 331 may be configured as a letter or a symbol that is readable when the first body 1 is located such that the second connection unit 35 faces the ground.

In some implementations the volumes of the first storage space S1 and the second storage space S3 are different from each other (e.g. the maximum amounts of detergents that can be measured through the respective storage spaces are different from each other), and it may be necessary to provide members for enabling the user to recognize the kind of the detergent the maximum amount of which can be determined through the respective storage spaces S1 and S2.

In some implementations, it may be possible to enable the user to recognize through which storage space S1 or S2 the maximum amount of each detergent necessary to treat the reference amount of laundry can be determined using a first indication unit 111 and a second indication unit 113 provided at the outer circumferential surface of the first body 11.

FIG. 1 shows an example in which the maximum amount of the liquid detergent can be checked through the first storage space S1 at the time of treating the reference amount of laundry and the maximum amount of the powder detergent can be checked through the second storage space S2 at the time of treating the reference amount of laundry.

However, since the upper open surface 133, through which the first storage space S1 communicate with the outside of the measuring vessel 100, is formed at the upper surface of the measuring vessel 100, and the second lower open surface 335, through which the second storage space S2 communicate with the outside of the measuring vessel 100, is formed at the lower surface of the measuring vessel 100, the second indication unit 113 may be indicated in a state in which the second indication unit 113 is turned over.

In some implementations, the first indication unit 111 may be configured as a letter or a symbol that is readable when the first body 1 is located such that the second lower open surface 335 faces the ground, and the second indication unit 113 may be configured as a letter or a symbol that is readable when the first body 1 is located such that the second connection unit 35 faces the ground.

The measuring vessel may be introduced into a laundry treatment apparatus having a laundry receiving space.

In some implementations, the measuring vessel 100 may be located in a laundry treatment apparatus 200.

As shown in FIG. 3, the laundry treatment apparatus 200 may include a cabinet 4 forming the external appearance of the laundry treatment apparatus 200, a tub 5 provided in the cabinet 4 for receiving wash water, a drum 6 rotatably provided in the tub 5 for providing a laundry receiving space, and a measuring vessel 100 configured to be introduced into the drum 6.

The cabinet 4 includes a door 42 for opening and closing an introduction port 41. Wash water is supplied to the tub 5 through a water supply unit 45 provided in the cabinet 4, and the wash water in the tub 5 is discharged out of the cabinet 4 through a drainage unit 46 provided in the cabinet 4.

The tub 5 may be provided with a tub introduction port, which communicates with the introduction port 41, and the drum 6 may be provided with a drum introduction port, which communicates with the tub introduction port. Meanwhile, the drum 6 may be rotated in the tub 5 by a driving unit 7.

The structure of the measuring vessel 100 was described in detail with reference to FIGS. 1 and 2, and therefore a detailed description thereof will be omitted.

The laundry treatment apparatus 200 including the measuring vessel 100 is operated as follows. Laundry is introduced into the drum 6 together with the measuring vessel 100. Subsequently, wash water is supplied to the tub 5 through the water supply unit 45, and the drum 6 is rotated by the driving unit 7 to wash the laundry. After washing of the laundry is completed, the wash water is drained through the drainage unit 46.

The subject matter disclosed in this application provides a measuring vessel that is capable of measuring the maximum amount of two or more different kinds of detergents at the time of treating a predetermined reference amount of laundry and a laundry treatment apparatus having the same.

In addition, the subject matter disclosed in this application provides a measuring vessel that is capable of preventing a user from using an excessive amount of detergent at the time of treating a reference amount of laundry and a laundry treatment apparatus having the same.

What is claimed is:

1. A measuring vessel comprising:
   a first body formed as a first storage space for receiving liquid detergent;
   a second body inside the first body to form a second storage space for receiving powder detergent;
   a first opening provided at a first end of the first body and configured to discharge the liquid detergent from the first storage space;
   a second opening provided at a first end of the second body and configured to discharge the powder detergent from the second storage space;
   a first connection unit having an outer circumferential surface configured to connect to a second end of the first body and an inner circumferential surface configured to connect to the first end of the second body, the first connection unit extending radially inward from the second end of the first body to the first end of the second body;
   a second connection unit provided to face the second opening and that is configured to close a surface of the second body;
   a first indication unit that is located within a proximity of the first opening and that is configured to indicate an amount of the liquid detergent in the first storage space; and
   a second indication unit that is located within a proximity of the second opening and that is configured to indicate an amount of the powder detergent in the second storage space,
   wherein the measuring vessel is configured to be inserted into a laundry treatment apparatus,
   wherein a cross-sectional area of the second body is provided to maintain or increase from the second opening toward the second connecting unit,
   wherein a volume of the second storage space is different from a volume of the first storage space,
   wherein the first indication unit is provided with a letter or a symbol arranged in a first particular position in a state in which the second connection unit faces a ground,
   wherein the second indication unit is provided with a letter or a symbol arranged in a second particular position in a state in which the first connection unit faces the ground,
   wherein the letter or the symbol of the first indication unit indicates the liquid detergent,
   wherein the letter or the symbol of the second indication unit indicates the powder detergent,
   wherein the second body extends in a direction parallel to the inner circumferential surface of the first connection unit, and wherein the first indication unit and the second indication unit are provided on an outer circumferential surface of the first body.

2. The measuring vessel according to claim 1, wherein: the first storage space is configured to measure an amount of a liquid detergent, and the second storage space is configured to measure an amount of a powder detergent.

3. The measuring vessel according to claim 1, wherein a distance between the first connection unit and the second connection unit is less than a distance between the first connection unit and an upper end of the first body.

4. The measuring vessel according to claim 1, wherein a single radius of curvature defines a cross-sectional shape of the second connection unit.

5. The measuring vessel according to claim 1, further comprising:
a first measuring unit that is configured to indicate an amount of detergent that is stored in the first storage space.

6. The measuring vessel according to claim 1, further comprising:
a second measuring unit that is configured to indicate an amount of detergent that is stored in the second storage space.

7. The measuring vessel according to claim 6, wherein the second measuring unit is configured as a letter or a symbol that is legible based on the second connection unit facing ground.

8. The measuring vessel according to claim 1, wherein the volume of the second storage space is greater than the volume of the first storage space.

9. The measuring vessel according to claim 1, wherein the volume of the second storage space is less than the volume of the first storage space.

10. The measuring vessel according to claim 1, wherein the first body extends from the outer circumferential surface of the first connection unit, and
wherein at least a portion of the first space is defined between the inner circumferential surface and the outer circumferential surface of the first connection unit.

11. The measuring vessel according to claim 1, wherein the second body is recessed from the second opening to an inside of the first body to define the first storage space and the second storage space,
wherein the first storage space is defined between an inner circumferential surface of the first body and an outer circumferential surface of the second body, and
wherein the second storage space is surrounded by an inner circumferential surface of the second body.

12. A laundry treatment apparatus comprising:
a cabinet;
a tub that is located in the cabinet and that is configured to receive wash water; and
a drum that is located in the tub, that is configured to receive laundry, and that is configured to receive a measuring vessel,
wherein the measuring vessel comprises:
a first body formed as a first storage space for receiving liquid detergent;
a second body inside the first body to form a second storage space for receiving powder detergent;
a first opening provided at a first end of the first body and configured to discharge the liquid detergent from the first storage space;
a second opening provided at a first end of the second body and configured to discharge the powder detergent from the second storage space;
a first connection unit having an outer circumferential surface configured to connect to a second end of the first body and an inner circumferential surface configured to connect to the first end of the second body, the first connection unit extending radially inward from the second end of the first body to the first end of the second body;
a second connection unit provided to face the second opening and that is configured to close a surface of the second body;
a first indication unit that is located within a proximity of the first opening and that is configured to indicate an amount of liquid detergent in the first storage space; and
a second indication unit that is located within a proximity of the second opening and that is configured to indicate an amount of the powder detergent in the second storage space,
wherein the measuring vessel is configured to be inserted into a laundry treatment apparatus,
wherein a volume of the second storage space is different from a volume of the first storage space,
wherein a cross-sectional area of the second connection unit is larger than a cross-sectional area of the first connection unit,
wherein the first indication unit is provided with a letter or a symbol arranged in a first particular position in a state in which the second connection unit faces a ground,
wherein the second indication unit is provided with a letter or a symbol arranged in a second particular position in a state in which the first connection unit faces the ground,
wherein the letter or the symbol of the first indication unit indicates the liquid detergent,
wherein the letter or the symbol of the second indication unit indicates the powder detergent,
wherein the second body extends in a direction parallel to the inner circumferential surface of the first connection unit, and
wherein the first indication unit and the second indication unit are provided on an outer circumferential surface of the first body.

13. The laundry treatment apparatus according to claim 12, wherein:
the first storage space is configured to measure an amount of a powder detergent, and
the second storage space is configured to measure an amount of a liquid detergent.

14. The laundry treatment apparatus according to claim 12, wherein:
the first storage space is configured to measure an amount of a liquid detergent, and
the second storage space is configured to measure an amount of a powder detergent.

* * * * *